(12) United States Patent
Chien

(10) Patent No.: US 6,577,802 B1
(45) Date of Patent: Jun. 10, 2003

(54) APPLICATION OF SILANE-ENHANCED ADHESION PROMOTERS FOR OPTICAL FIBERS AND FIBER RIBBONS

(75) Inventor: Ching-Kee Chien, Horseheads, NY (US)

(73) Assignee: Corning Incorporated, Corning, NY (US)

(*) Notice: Subject to any disclaimer, the term of this patent is extended or adjusted under 35 U.S.C. 154(b) by 93 days.

(21) Appl. No.: 09/616,103

(22) Filed: Jul. 13, 2000

(51) Int. Cl.7 .............................. G02B 6/02; B05D 5/10
(52) U.S. Cl. .................... 385/128; 427/162; 427/163.2
(58) Field of Search ................................. 385/123–128; 427/387, 335, 207.1–211, 163.2, 162, 165–168, 255.23; 522/91–98

(56) References Cited

U.S. PATENT DOCUMENTS

| 4,099,837 A | 7/1978 | Vazirani ................. 350/96.29 |
| 4,147,407 A | 4/1979 | Eichenbaum et al. .... 350/96.34 |
| 4,324,575 A | 4/1982 | Levy ......................... 65/3.11 |
| 4,474,830 A | 10/1984 | Taylor ....................... 427/54.1 |
| 4,486,212 A | 12/1984 | Berkey .......................... 65/2 |
| 4,568,566 A | 2/1986 | Tolentino ................... 427/54.1 |
| 4,752,112 A | 6/1988 | Mayr ...................... 350/96.23 |
| 4,783,374 A * | 11/1988 | Custer et al. ............... 428/447 |
| 4,792,347 A | 12/1988 | Deneka et al. ............... 65/3.11 |
| 4,849,462 A | 7/1989 | Bishop ........................ 522/97 |
| 4,851,165 A | 7/1989 | Rennell, Jr. et al. ......... 264/1.5 |
| 4,875,759 A | 10/1989 | Ogawa ................... 350/96.34 |
| 4,889,901 A | 12/1989 | Shama et al. ................ 526/279 |
| 4,921,880 A | 5/1990 | Lee et al. ...................... 522/12 |
| 4,955,688 A * | 9/1990 | Chapin et al. ............... 385/123 |
| 4,962,992 A | 10/1990 | Chapin et al. ........... 350/96.23 |
| 4,969,711 A | 11/1990 | Rogler et al. ............ 350/96.34 |
| 5,018,829 A | 5/1991 | Ogawa ................... 350/96.34 |
| RE33,677 E | 8/1991 | Vazirani ...................... 385/123 |
| 5,104,433 A | 4/1992 | Chapin et al. ................ 65/3.1 |

(List continued on next page.)

FOREIGN PATENT DOCUMENTS

| EP | 0 261 772 A1 | 3/1988 | .......... C03C/25/02 |
| EP | 0 950 908 A2 | 10/1999 | |

(List continued on next page.)

OTHER PUBLICATIONS

Midwinter, "Optical Fibers for Transmission", New York, John Wiley pp. 166–178 (1979).

(List continued on next page.)

*Primary Examiner*—Rodney Bovernick
*Assistant Examiner*—Juliana K. Kang
(74) *Attorney, Agent, or Firm*—James V. Suggs; Timothy R. Krogh

(57) ABSTRACT

The present invention is directed to methods of applying an adhesion-promoting intermediary layer to an optical fiber using a carrier gas. The present invention is also directed to optical fibers and ribbons which have polymeric coatings with improved adhesion characteristics. The optical fibers comprise an adhesion-promoting intermediary layer between the cladding and primary polymeric coating which comprises a silane.

28 Claims, 2 Drawing Sheets

U.S. PATENT DOCUMENTS

| | | | |
|---|---|---|---|
| 5,109,442 A | 4/1992 | Klainer et al. | 385/12 |
| 5,128,387 A | 7/1992 | Shustack | 522/92 |
| 5,128,391 A | 7/1992 | Shustack | 522/92 |
| 5,146,531 A | 9/1992 | Shustack | 385/128 |
| 5,188,864 A | 2/1993 | Lee et al. | 427/515 |
| 5,219,896 A | 6/1993 | Coady et al. | 522/96 |
| 5,239,026 A | 8/1993 | Babirad et al. | 526/245 |
| 5,262,362 A | 11/1993 | Covino-Hrbacek | 501/12 |
| 5,314,975 A * | 5/1994 | Babirad et al. | 526/248 |
| 5,336,563 A | 8/1994 | Coady et al. | 428/375 |
| 5,352,712 A | 10/1994 | Shustack | 522/31 |
| 5,366,527 A | 11/1994 | Amos et al. | 65/382 |
| 5,384,342 A | 1/1995 | Szum | 522/172 |
| 5,414,727 A | 5/1995 | Berndt et al. | 372/38 |
| 5,459,175 A | 10/1995 | Woods et al. | 522/180 |
| 5,461,691 A | 10/1995 | Schunck et al. | 385/123 |
| 5,486,378 A | 1/1996 | Oestreich et al. | 427/163.2 |
| 5,514,737 A | 5/1996 | Green et al. | 522/15 |
| 5,527,835 A | 6/1996 | Shustack | 522/42 |
| 5,536,529 A | 7/1996 | Shustack | 427/163.2 |
| 5,538,791 A | 7/1996 | Shustack | 428/392 |
| 5,539,014 A | 7/1996 | Swedo et al. | 522/91 |
| 5,587,403 A | 12/1996 | Shustack | 522/42 |
| 5,595,820 A | 1/1997 | Szum | 428/378 |
| 5,718,967 A * | 2/1998 | Hu et al. | 428/216 |
| 5,902,636 A * | 5/1999 | Grabbe et al. | 427/221 |
| 5,949,940 A | 9/1999 | Botelho | 385/114 |
| 5,985,374 A * | 11/1999 | Grabbe et al. | 427/444 |
| 5,999,681 A * | 12/1999 | Grabbe et al. | 385/128 |
| 6,132,808 A * | 10/2000 | Brown et al. | 427/387 |
| 6,222,969 B1 | 4/2001 | Botelho et al. | 385/114 |
| 6,261,638 B1 * | 7/2001 | van Ooij et al. | 427/379 |
| 6,316,516 B1 * | 11/2001 | Chien et al. | 522/91 |
| 6,326,416 B1 * | 12/2001 | Chien et al. | 522/91 |
| 6,409,875 B1 * | 6/2002 | Giardello et al. | 156/334 |

FOREIGN PATENT DOCUMENTS

| | | | |
|---|---|---|---|
| EP | 0 976 693 A1 | 2/2000 | C03C/25/10 |
| GB | 1 477 171 | 6/1977 | G02B/5/14 |
| GB | 1 570 624 | 7/1980 | |
| JP | 02-048434 | 2/1990 | |

OTHER PUBLICATIONS

Blankenship et al., "The Outside Vapor Deposition Method of Fabricating Optical Waveguide Fibers", IEEE J. Quantum Electron., vol. 18, pp. 1418–1423 (1982).

Inada, "Recent Progress in Fiber Fabrication Techniques by Vapor–phase Axial Deposition", IEEE J. of Quantum Electron., vol. 18, pp. 1424–1431.

Japanese Abstract 02 048434 A.

Japanese Abstract 10 150033 A.

* cited by examiner

APPLICATION OF SILANE-ENHANCED ADHESION PROMOTERS FOR OPTICAL FIBERS AND FIBER RIBBONS

FIELD OF THE INVENTION

The present invention relates generally to optical fibers and optical fiber ribbons with silane-enhanced adhesion characteristics and a method of making fibers and ribbons and, in particular, to methods of applying a silane adhesion promoter to the interface of an optical fiber coating and a glass fiber.

BACKGROUND OF THE INVENTION

A single optical waveguide fiber, referred to herein as an "optical fiber," can carry thousands of times more voice transmissions than a single copper conducting wire. Because of their increased capacity for voice transmissions, optical fibers have now largely replaced copper conductors in long haul telecommunications cable and are widely used for data transmission as well. Increased use of fiber optics in local loop telephone and cable TV service is expected, as local fiber networks are established to deliver ever greater volumes of information in the form of data, audio, and video signals to residential and commercial users. In addition, use of optical fibers in the home and in business for internal data, voice, and video communications has begun and is expected to increase.

Optical fiber ribbons provide a modular design which simplifies the construction, installation, and maintenance of optical fiber cable by eliminating the need to handle individual fibers. An optical fiber ribbon is constructed of a plurality of optical fibers, each of which is typically coated with one or more polymeric coatings which serve to protect and cushion the optical fiber. The plurality of coated fibers is held in a coplanar arrangement by ribbon matrix material which bonds the individual optical fibers to each other or surrounds the plurality of optical fibers in a common outer jacket or sheathing.

Use of optical fiber ribbons promises to reduce the labor and cost involved in splicing individual optical fibers, because the optical fibers in the ribbon can be spliced by connecting the much larger ribbon, provided that the positions of the optical fibers therein can be precisely fixed and maintained. In one method commonly used to splice ribbons, referred to as mass fusion splicing, the first step involves the complete removal of all protective polymer coatings and the ribbon matrix material. The process relies upon a V-block to align the individual fibers. The V-block controls angular alignment particularly well so long as the optical fiber is free of any protrusions, such as non-uniform primary coating material residue, in the region where the optical waveguide contacts the V-block. In addition, the V-block permits precise alignment of the two optical fiber ends so long as the residual primary coating material on the two ends has the same thickness. Consequently, alignment of the two optical fibers and the success of the mass fusion splice depend on the removal of the protective coatings. Indeed, if the coating materials cannot be cleanly and easily stripped, splicing operations using the V-block and other similar devices will be seriously hampered.

The adoption of fiber optics for local loop applications presents new challenges. The core of an optical waveguide fiber, or optical fiber, is usually constructed of a silica material that can be easily damaged by moisture and other environmental hazards. Protecting the optical fiber from these hazards is likely to become of increased concern, especially as the use of optical fibers in local data, audio, and video signal transmission grows. In contrast to the comparatively hermetic conditions in long distance cables, where fiber exposure points are far fewer and more sheltered, optical fibers employed in local loop applications have a larger number of splices and are more prone to attack from a variety of environmental hazards. For example, optical fiber connections are commonly made in neighborhood pedestals, which are frequently unsealed, giving insects and animals access to the optical fiber and exposing the optical fiber to moisture and water. Moreover, a substantial percentage of fiber optic cables will find installation in existing pipe chases, including pipe chases containing steam lines, where there are risks to the coatings form thermal damage, alone and in combination with high humidity, to say nothing of direct steam impingement.

Many of these environmental hazards can be remedied by coating the optical fiber. An optical fiber is typically constructed of a central core, a cladding layer, a primary (or inner primary) coating and a secondary (or outer primary) coating. The coating layers of an optical fiber serve many functions. First, the coating layers protect the optical fiber from damage and breakage during the installation of the optical fiber or ribbon and throughout the life of the fiber or ribbon. Second, the coating layers must ensure the stability of the fiber transmission characteristics. Considerations in the design of the coating layer must ensure that optical attenuation or loss of the fiber is kept to a minimum. Third, the coating layers on an optical fiber should impart mechanical properties to the optical fiber to allow ease of handling and long-term use. Bare optical fibers, comprised of the central core and cladding, are brittle and fragile. The coating on an optical fiber allows the fiber to withstand such stresses as tension, torsion, compression, bending, squeezing or vibration that it will be exposed to in the field. Lastly, the coating layers can also provide both ease of identification and joining of the fibers for an experienced field technician who needs to splice the ends of the optical fiber.

The ability of the coatings to protect the optical fiber from mechanical stresses and moisture has been correlated with the strength of the wet adhesive forces between the primary coating and the cladding layer. The adhesion of the coating to the cladding at this interface is of critical importance. If the coating pulls away or delaminates from the cladding layer, moisture can enter into the optical fiber and attack and degrade the silica glass. Delamination usually results in a weakened optical fiber because the delaminated coating can slide against the surface of the cladding causing microscopic scratches at the surface. These microscopic scratches act as crack initiation points which weaken the overall strength of the fiber. Further, delamination along the length of the fiber could cause high transmission loss or an increased attenuation.

To counter delamination and promote the adhesion of the disparate materials of the cladding and primary coating layer, manufacturers of optical fibers have added a small percentage by weight of adhesion promoting agents, such as silanes, into the primary coating composition. An optical fiber, after being formed, is subsequently coated by a primary or inner primary coating which contains silanes as part of the coating mixture. The primary coating is cured on-line via thermal or ultraviolet radiation. Curing transforms the liquid coating solution into a solid. Adhesion promoting agents in the coating solution, however, react with other constituents and have a negative impact on the cure rate of the primary coating layer. Since the coating of the optical fiber is performed on-line in a continuous process, decreasing the cure rate of the primary coating layer slows down the efficiency, rate, and cycle time of the manufacturing process.

Adhesion promoting agents may also make it difficult to remove the primary coating from the cladding layer in order to splice or rejoin the optical fiber. One of the principal drawbacks to the use of optical fibers is the difficulty in achieving an end-to-end splice with acceptable light transmission loss. For a good connection, the cores of the two fibers must be aligned very precisely or else the attenuation of the fiber increases. At present, this requires a high level of skill by the installer, as well as more time and more expensive tools relative to installations employing metallic conductors. Moreover, this problem, though important in long haul transmission fibers, is exacerbated when the fiber is used in local applications, where the number of splices per unit length of fiber installed is greatly increased.

Japanese Patent Application No. HEI 2[1990]-48434 reports a method of manufacturing an optical fiber comprising a silane coupling agent. The drawn glass fiber is passed through high-temperature vapors of a concentrated silane coupling agent to form a silane coupling agent layer on the surface of the glass fiber. The temperature at which the silane vapor is generated and applied is above the boiling temperature of the silanes but below the decomposition temperature. In addition, the silane is applied by condensation to the glass fiber as a saturated silane vapor.

The requirements of strong, adhesive bonding at the interface of the primary coating and cladding layer of the optical fiber and ease and uniform strippability have presented a difficult challenge in primary coating formulation. An additional challenge is to ensure that the adhesion promoting agent will not have a negative impact on the cure rate of the primary coating which will slow down the manufacturing process. It is preferred that the present invention is directed to meeting the dual requirements of good adhesion and ease of strippability of the primary coating layer without the negative impact on the cure rate of the primary coating by the addition of a thin, intermediary layer of an adhesion-promoting agent at the cladding—primary coating interface.

SUMMARY OF THE INVENTION

The present invention relates to a method of applying an adhesion-promoting intermediary layer to an optical fiber comprising providing an optical fiber and contacting the surface of the optical fiber with a mixture of an adhesion promoter and a carrier gas to form an adhesion-promoting intermediary layer. The carrier gas is preferably carbon dioxide. The adhesion promoter preferably comprises a silane including, but not limited to, azidosilane, aminoalkoxysilane, polymeric silane, polymeric organosilane, organofunctional silane, vinyl ether urethane silane, organochlorosilane, silsesquioxane, polyalkoxysiloxane, and fluorinated acrylamide silane. Preferably, the adhesion promoter comprises 1,4-bis(trimethoxysilylethyl)benzene. The mixture can be atomized and vaporized.

The present invention also relates to a method of coating an optical fiber comprising providing an optical fiber, contacting the surface of the optical fiber with a mixture of an adhesion promoter and a carrier gas to form an adhesion-promoting intermediary layer, contacting the optical fiber with a liquid acrylate, and curing the liquid acrylate with ultraviolet radiation to form a primary polymeric coating material layer surrounding the adhesion-promoting intermediary layer. The carrier gas is preferably carbon dioxide. The adhesion promoter preferably comprises a silane including, but not limited to, azidosilane, aminoalkoxysilane, polymeric silane, polymeric organosilane, organofunctional silane, vinyl ether urethane silane, organochlorosilane, silsesquioxane, polyalkoxysiloxane, and fluorinated acrylamide silane. Preferably, the adhesion promoter comprises 1,4-bis(trimethoxysilylethyl)benzene. The mixture can be atomized and vaporized. The optical fiber can also be contacted with a second liquid acrylate which is cured using ultraviolet radiation to form a secondary polymeric coating material layer surrounding the primary polymeric coating material layer. The optical fiber is contacted with the mixture of the adhesion promoter and carrier gas at a temperature below the boiling temperature of the adhesion promoter, such as about 60° C.

The present invention relates to an optical fiber with improved adhesion characteristics. The optical fiber comprises a core, a cladding layer surrounding the core, adhesion-promoting intermediary layer comprising, a silane (preferably, 1,4-bis(trimethoxysilylethyl)benzene) surrounding the cladding layer, and a primary polymeric coating material comprising a liquid acrylate compound surrounding the adhesion-promoting intermediary layer. The fiber can also comprise a secondary polymeric coating material surrounding the primary polymeric coating material, wherein the secondary polymeric coating material comprises a liquid acrylate compound. The optical fiber can also comprise an ink coating material surrounding the secondary polymeric coating material.

The present invention also preferably relates to an optical fiber ribbon comprising a plurality of coated, substantially coplanar optical fibers, each comprising a core, a cladding layer surrounding the core, an adhesion-promoting intermediary layer comprising 1,4-bis(trimethoxysilylethyl)benzene surrounding the cladding layer, a primary polymeric coating material comprising a liquid acrylate compound surrounding the adhesion promoting intermediary layer, and a ribbon matrix material which maintains substantially coplanar alignment of the plurality of coated optical fibers. The fibers within the ribbon can also comprise a secondary polymeric coating material surrounding the primary polymeric coating material, wherein the secondary polymeric coating material comprises a liquid acrylate compound. The optical fiber can also comprise an ink coating material surrounding the secondary polymeric coating material.

DESCRIPTION OF PREFERRED EMBODIMENTS

Figure 1:
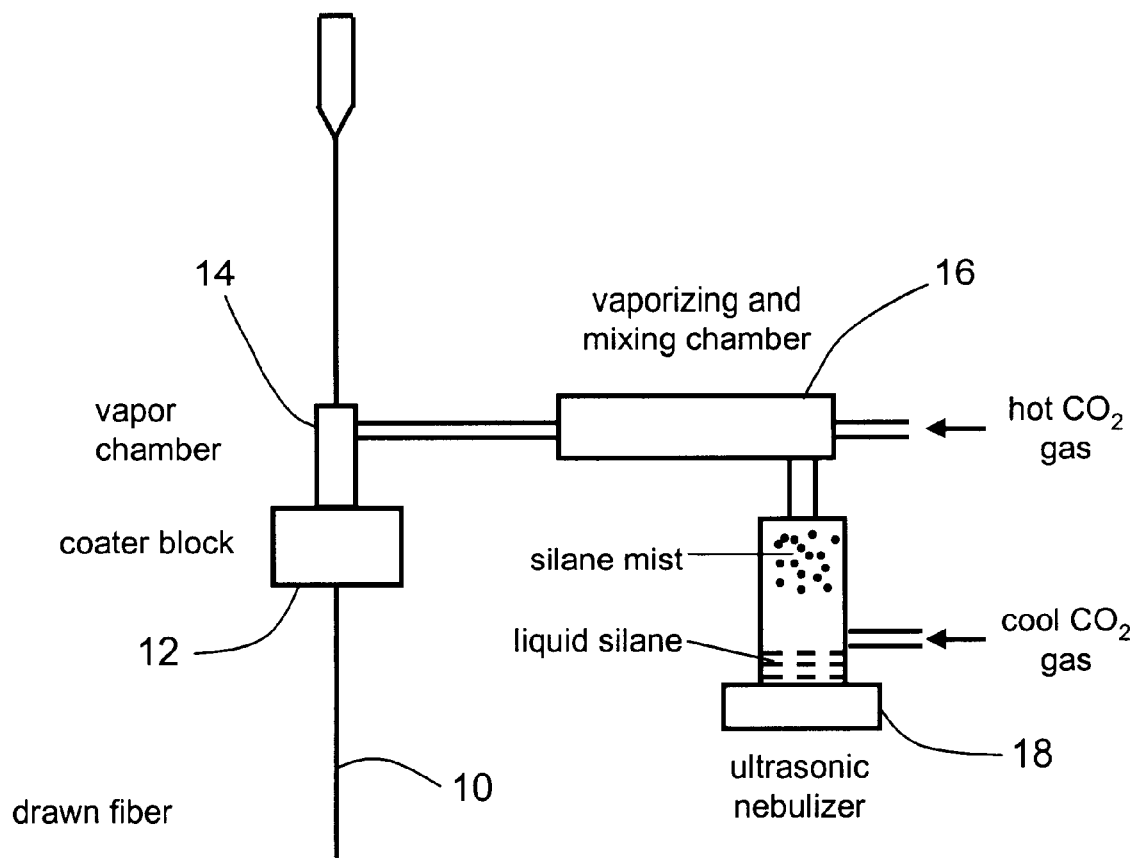
FIG. 1 is a schematic of a representative apparatus for contacting the optical fiber with the mixture of the adhesion promoter and carrier gas.

The present invention is directed to methods of applying an adhesion-promoting intermediary layer to an optical fiber and coating an optical fiber; a representative apparatus for performing these methods is depicted in FIG. 1. The present invention also is directed to, in part, optical fibers, a representative cross-sectional view of which is presented in FIG. 2. The present invention is also directed, in part, to an optical fiber ribbon, a representative cross-sectional view of which is presented in FIG. 3.

Figure 2:
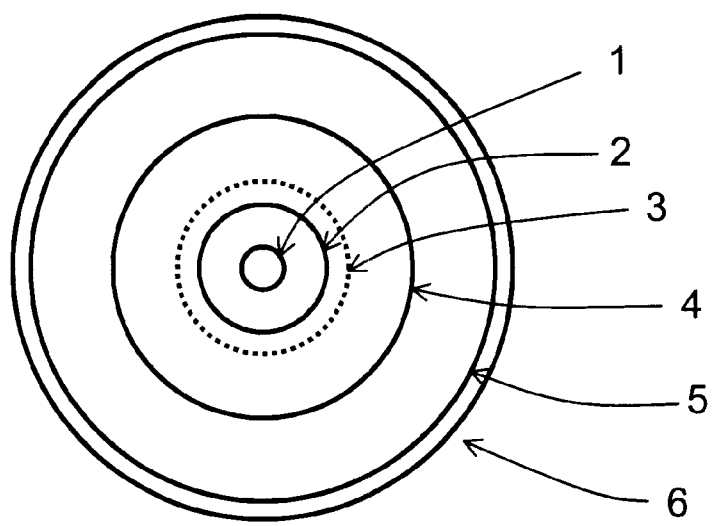
FIG. 2 is a cross-sectional view of an example of a optical fiber according to the present invention.

As FIG. 2 illustrates, the optical fiber is comprised of a central core 1, a cladding layer 2 surrounding and adjacent to the glass core 1, an adhesion-promoting intermediary layer 3, and a primary polymeric coating layer 4 surrounding and adjacent to the intermediary layer 3. Primary polymeric coating layer 4 can, optionally, be surrounded by and adjacent to a secondary polymeric coating material 5. Secondary coating material 5 can be a tight fit coating or, alternatively, a loose tube coating. In a dual coating system, primary coating layer 4 forms a soft, rubbery compliant layer that acts as a buffer when the fiber is bent cabled or spooled. Secondary coating layer 5 acts as a hard, protective outer layer which prevents the fiber from damage from processing or use.

The optical fiber components of the optical fiber ribbon of the present invention can, optionally, also include a coloring material, such as a colored ink coating layer 6 which identifies each optional fiber in the ribbon. Preferably, the optional ink coating layer 6 surrounds and is adjacent to the outermost polymeric coating material—either primary coating layer 4 or secondary coating layer 5. Referring again to FIG. 2, where the optical fiber includes the optional secondary polymeric coating material 5, ink coating layer 6 surrounds and is adjacent to secondary polymeric coating material 5.

Figure 3:
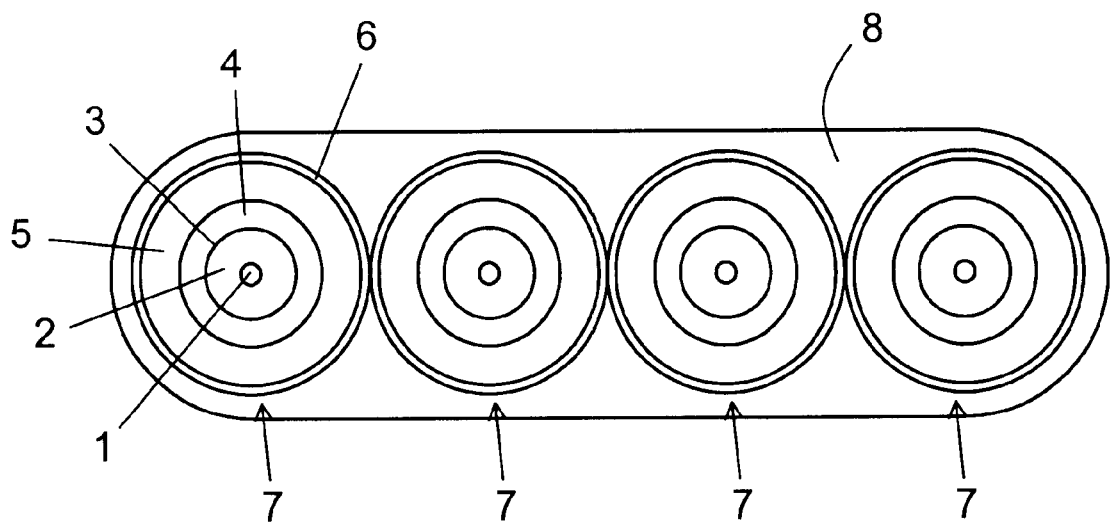
FIG. 3 is a cross-sectional view of an example of a 4-fiber ribbon according to the present invention.

FIG. 3 depicts a fiber ribbon cable. The optical ribbon cable depicted consists of four coated, substantially coplanar optical fibers 7 set in ribbon matrix material 8. The present invention, however, is not limited to a four optical fiber cable. A plurality of coated, substantially coplanar optical fibers 7 can be set within the ribbon matrix material 8. The adhesion promoting intermediary layer 3 is shown in FIG. 3 as a thin layer that lies on the surface of cladding layer 2 and serves as the cladding layer-primary polymeric coating interface. Upon application of a longitudinal stripping force at the adhesion promoting intermediary layer 3 or interface, the ribbon matrix material 8 and a portion of the primary polymeric coating material 4 are substantially removed from cladding layer 2 leaving a continuous, smooth residual layer of the primary polymer coating layer 4 with a thickness of less than about 5 $\mu$m.

An aspect of the present invention relates to a method of applying an adhesion-promoting intermediary layer to an optical fiber comprising providing an optical fiber and contacting the exterior surface of the optical fiber with a mixture of an adhesion promoter and a carrier gas to form an adhesion-promoting intermediary layer. Adhesion promoters that can be used in accordance with the present methodologies are described below. Preferably, the adhesion promoter is a silane or silane-containing compound. Preferably, the silane is selected from the group consisting of azidosilane, aminoalkoxysilane, polymeric silane, polymeric organosilane, organofunctional silane, vinyl ether urethane silane, organochlorosilane, silsesquioxane, polyalkoxysiloxane, and fluorinated acrylamide silane. A preferred adhesion promoter is 1,4-bis(trimethoxysilylethyl) benzene. The carrier gas is preferably carbon dioxide, helium, oxygen, or mixture thereof (see, U.S. Pat. No. 4,792,347 which is incorporated herein by reference in its entirety). The silane is preferably atomized and vaporized.

The present invention differs from the art by removing the adhesion promoting agent as a component in the primary coating solution and applying the agent directly to the surface of the cladding layer or substrate and, thus, forming a separate layer, an adhesion-promoting intermediary layer, comprising the silane adhesion promoter. The thickness of the adhesion-promoting intermediary layer is less than about 1 $\mu$m. The optical fibers of the present invention exhibit enhanced adhesive strength between the cladding layer and the primary polymeric coating material.

In a preferred embodiment of this invention, a thin film of the adhesion promoting intermediary layer is applied to the surface of a bare optical fiber using a vapor deposition technique. A thin film of a silane compound having the general formula $R_nSiX_{4-n}$ (or any of the adhesion promoters listed below), is deposited on the surface of the bare optical fiber in the presence of a carrier gas including, but not limited to, $CO_2$ at temperatures below the boiling temperature of the adhesion promoter preferably. With respect to the general formula, R is a nonhydrolyzable organic radical that possesses a functionality which enables the coupling agent to bond with organic resins and polymers, X is a hydrolyzable group, typically alkoxy, acyloxy, amine or a halogen such as chlorine, and n is an integer ranging from 0 to 4 and preferably 1 to 3. Preferably, the temperature of the glass fiber to which the adhesion promoter is applied is about 60 to about 100° C. The silane compound, or other adhesion promoter, is preferably atomized by, for example, an ultrasonic nebulizer to provide a very fine mist of the silane, which is in the range of microns. The silane mist is then preferably heated to vaporize. The silane vapor is carried by $CO_2$ to an apparatus on top of a coating block where a coating is supplied to coat the glass fiber. As the glass fiber enters into the meniscus of a coating, the fiber carries the $CO_2$ with silane as the fiber boundary layer into the coating. A representative apparatus for applying the adhesion-promoting intermediary layer to an optical fiber is depicted in FIG. 1, and may comprise a coater block (12), a vapor chamber (14), a vaporizing and mixing chamber (16), and an ultrasonic nebulizer (a.k.a. atomizer) (18), which may be used to prepare a drawn fiber (10).

An example of a suitable coater block that may be used to practice the invention is a coater block that includes a coating die as described in U.S. Pat. No. 5,366,527 which is incorporated herein by reference. It is preferred that vapor chamber 14 is a stainless steel cylinder, however, the invention is not limited to the use of stainless steel cylindrical vapor chamber. Chamber 14 is preferably operated at a temperature of about 60 to about 100° C. and about atmospheric pressure. For a draw speed of more than 5 m/s, a preferred flow rate of vapor into chamber 14 is about 9 to about 14 ft$^3$/hr (CF/H). A preferred concentration of silane of the vapor in chamber 14 is about 0.1 to about 0.3 mmole of silane/liter of carrier gas, a more preferred concentration is about 0.16 to about 0.2 mmole of silane/liter of carrier gas.

Vaporizing and mixing chamber 16 is also preferably constructed from stainless steel. The material of construction of chamber 16 is not limited to only stainless steel. A preferred operating temperature of chamber 16 is about 50 to about 200° C. (more preferred about 100 to about 150° C.) and a preferred operating pressure is atmospheric pressure. A preferred flow rate of hot $CO_2$ gas into chamber 16 is about 5 to about 12 ft$^3$/hr (CF/H). The hot $CO_2$ gas entering chamber 16 is at a temperature above ambient conditions. Preferably the hot $CO_2$ gas entering, chamber 16 is at least about 100° C.

A commercial grade humidifier is one example of a suitable nebulizer 18. Preferably, nebulizer 18 is operated at ambient temperature at atmospheric pressure. A preferred amount of amount of silane in nebulizer 18 is about 5 to about 15 ml, more preferably about 10 ml. A preferred mass flowrate of silane exiting nebulizer 18 is about 0.01 to about 0.5 g/min, more preferably about 0.05 to about 0.1 g/min. A preferred flowrate of cool $CO_2$ gas into nebulizer 18 is about 1 to about 10 ft³/hr, more preferably about 2 to about 6 ft³/hr. It is also preferred that the cool $CO_2$ gas is at about ambient conditions.

A suitable source for $CO_2$ gas is Empire Air of Corning, N.Y. Suitable sources for the silane adhesion promoter include Aldrich Chemical Company of Milwaukee, Wis., Gelest of Tullytown, Pa., or United Chemical Technologies, Inc. of Bristol, Pa.

The present method employs the mechanism of bubble-free deposition disclosed in U.S. Pat. No. 4,792,347, which is incorporated herein by reference in its entirety. Preferably, the Adhesion promoter is atomized and vaporized and carried by a bubble-free carrier gas to the interface. Preferred bubble-free gases include oxygen, carbon dioxide, helium, and mixtures thereof. The bubble-free gas dissolves in the proximity of the interface with the primary polymeric coating layer that is subsequently applied to the glass fiber. The molecules of the adhesion promoter agent is much bigger than the gas molecules and, thus, diffuses out much slower than the gas. Thus, the adhesion promoter will stay at the interface to form adhesive bonds between the coating and the glass.

An aspect of the present invention relates to a method of coating an optical fiber comprising providing an optical fiber, contacting the surface of the optical fiber with a mixture of an adhesion promoter and a carrier gas to form an adhesion-promoting intermediary layer, as described above, contacting the optical fiber with a liquid acrylate, and curing the liquid acrylate with ultraviolet radiation to form a primary polymeric coating material layer surrounding the adhesion-promoting intermediary layer.

The optical fiber contained in the optical fiber ribbon of the present invention includes a core. Suitable fibers include step-index fibers, having a core whose refractive index is constant with distance from the fiber axis, and graded-index fibers, having a core whose refractive index varies with distance from the fiber axis. Any core materials, such as those identified in U.S. Pat. No. 4,486,212, which is incorporated herein by reference in its entirety, can be used. The core is typically a silica glass having a cylindrical cross section and a diameter ranging from about 5 to about 10 μm for single mode fibers and from about 20 to about 100 μm for multimode fibers. The core can optionally contain varying amounts of other materials, such as oxides of titanium, thallium, germanium, fluorine, and boron, which modify the core's refractive index. Alternatively, the core can be a plastic material. However, because attenuation loss for plastic-core fibers is large, typically several hundred dB/km, compared to attenuation loss for glass-core fibers, typically less than 10 dB/km, the use of plastic-core fibers is usually limited to very short path lengths.

The core is advantageously surrounded by and adjacent to a cladding layer having a refractive index less than the refractive index of the core. A variety of cladding materials, both plastic and glass (e.g., silica and borosilicate glasses) are used in constructing optical fibers, and any of these materials can be used to form the cladding layer in the optical fiber ribbons of the present invention.

In many applications, the core and cladding layer have a discernible core-cladding boundary. Alternatively, the core and cladding layer can lack a distinct boundary, such as where the core and cladding, generally both made of glass, are diffused into one another to form a graded index fiber. In another arrangement, the cladding layer can be made of a series of glass or plastic layers of varying refractive index. The optical fiber ribbon of the present invention can contain fibers which have any of the above core-cladding layer configurations.

The cladding layer is surrounded by and bonded to the adjacent primary polymeric coating material by the intermediary layer. The primary polymeric coating material is constituted so that, upon application of a longitudinal stripping force at the cladding layer-primary polymeric coating material interface, the ribbon matrix material and the primary polymeric coating material are substantially removed from the cladding layer leaving a continuous, smooth residual layer of the primary polymeric coating material. The thickness of the residual primary polymeric coating material is less than about 5 μm, preferably less than about 3 μm, more preferably, less than about 1 μm.

The primary polymeric coating material preferably includes ethylenically unsaturated, ultraviolet-curable polymers, such as a poly(alkyl alkacrylate or a acrylate-terminated (meth)acrylate. Suitable poly(alkyl (meth) acrylate)s include methyl methacrylate, ethyl methacrylate, and the like. Other suitable primary polymeric coating materials, such as those described in U.S. Pat. No. 4,324,575, which is incorporated herein by reference in its entirety, will be evident to those skilled in the art. One particularly preferred primary polymeric coating material combines an acrylate with the coating material described in U.S. Pat. No. 5,219,896, which is incorporated herein by reference in its entirety.

Briefly, the particularly preferred primary coating material comprises: (1) about 30 to about 80 weight percent, based on the total weight of the coating composition, of an acrylate-terminated polyurethane ("acrylated polyurethane") having a number average molecular weight of about 2,500 to about 8,000 daltons; (2) about 20 to about 60 weight percent of an acrylate of an unsubstituted or $C_7$–$C_{10}$, preferably $C_8$–$C_9$, alkyl substituted phenol that is alkoxylated with a $C_2$–$C_4$ alkylene oxide and contains about 1 to about 5 moles of the oxide per mole of phenol; and (3) about 5 to about 30 weight percent of at least one alkyl acrylate having a glass transition temperature ("$T_g$") from about –90° C. to about –45° C., preferably below about –60° C.

The acrylate-terminated polyurethane is the reaction product of a prepolymer, an organic diisocyanate, and a hydroxy acrylate. The prepolymer is a carbon chain that can comprise oxygen and/or nitrogen atoms to which the terminal acrylate functionality is added by use of the diisocyanate. The prepolymer has on average at least about two prepolymer functional groups that are reactive with the isocyanate group, e.g., a hydroxy, mercapto, amine, or similar group. The number average molecular weight of the prepolymer is about 700 to about 2,000, preferably about 800 to about 2,000, daltons. Suitable prepolymers include polycarbonates, and mixtures of polyethers (e.g. poly (propylene oxide) and poly(tetramethylene glycol)) and polycarbonates. Although all of the above-described prepolymers are suitable for use in the optical fiber ribbon of the present invention, when utilized with the acrylate of the alkoxylated phenol, the polycarbonate diols give superior results, especially from the standpoint of hydrolytic and oxidative stability, and thus are preferred.

Polycarbonate diols are produced by the alcoholysis of diethylcarbonate or diphenylcarbonate with an alkane diol, such as 1,4-butane diol, 1,6-hexane diol, and 1,12-dodecane diol; an alkylene ether diol, such as triethylene glycol and tripropylene glycol; or mixtures thereof. Suitable polycarbonate diols include DURACARB 122, commercially available from PPG Industries and PERMANOL KM10-1733, commercially available from Permuthane, Inc., Mass. DURACARB 122 is produced by the alcoholysis of diethylcarbonate with hexane diol.

A wide variety of diisocyanates alone or in mixture with one another can be utilized to prepare the acrylated polyurethane. Representative diisocyanates include, but are not limited to, toluene diisocyanate, methylene diphenyl diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and, preferably, isophorone diisocyanate ("IPDI").

The hydroxy acrylate can be a monoacrylate or a polyacrylate. The reaction of the isocyanate group with a hydroxy group of the hydroxy acrylate produces a urethane linkage which results in the formation of an acrylate terminated urethane. Suitable monohydric acrylates include, but are not limited to, the hydroxy $C_2$–$C_4$ alkyl acrylates and polyacrylates, such as 2-hydroxyethyl acrylate, 2-hydroxypropyl acrylate, glyceryl diacrylate, and mixtures thereof. The methacrylate counterparts of the above acrylates can also be utilized.

To prepare the acrylated polyurethane, the prepolymer diol, diisocyanate, and hydroxy acrylate (in a mole ratio of about 1:2:2, respectively, to about 5:6:2, respectively) are mixed with a minor amount of a catalyst, such as about 0.03 to about 0.1, preferably about 0.04, weight percent of dibutyl tin dilaurate. A sparge of dry gas, such as dry air, nitrogen, or carbon dioxide, is utilized to ensure there is no moisture present which can adversely affect the reaction. The reaction is conducted at a temperature of about 40° C. to about 80° C. for a time period sufficient to consume substantially all of the hydroxy functionality of the prepolymer diol and the hydroxy acrylate and the free nitrogen-carbon-oxygen groups ("NCO") of the diisocyanate. Further details relating to the preparation of acrylated polyurethanes are disclosed in U.S. Pat. No. 5,219,896.

The primary polymeric coating material can include small amounts (typically from about 0.5 to about 6 percent) of photoinitiators and inhibitors, adhesion promoters, and stabilizers.

The photoinitiators utilized are components of light curable ethylenically unsaturated coatings. Suitable photoinitiators include, but are not limited to, aryl ketones, such as benzophenone, acetophenone, diethoxy acetophenone, benzoin, benzil, anthraquinone, and the like. A commercial photoinitiator is illustrated by IRGACURE 184, which is hydroxycyclohexyl phenyl ketone available from Ciba-Geigy Corp., Ardsley, N.Y. When necessary, free radical polymerization can be inhibited by the use of an agent, such as phenothiazine or butylated hydroxytoluene in an amount less than about 0.1 weight percent.

Stabilizers, such as hindered amines, which provide ultraviolet stability for the cured composition, can be present in amounts less than about 1 weight percent. Illustrative stabilizers include bis(2,2,6,6-tetramethyl-4-piperidinyl) sebacate, which is commercially available from Ciba-Geigy Corp., Ardsley, N.Y., under the trade designation TINUVIN 770 and thiodiethylene (3,5-di-tert-butyl-4-hydroxy) hydrocinnamate, also commercially available from Ciba-Geigy Corp. under the trade designation IRGANOX 1035.

Typical coating materials for use in secondary coatings include urethane acrylate liquids whose molecules become cross-linked when exposed to ultraviolet light. Other suitable materials for use in the secondary polymeric coating material, as well as consideration related to selection of these materials, are well known to those skilled in art and are described in, for example U.S. Pat. Nos. 4,962,992 and 5,104,433, each of which is incorporated herein by reference in its entirety. Various additives that enhance one or more properties of the coating can also be present, including the above-mentioned additives incorporated in the primary polymeric coating material.

The thickness of the cladding and each of the coatings as well as the diameter of the core are not critical to the practice of the present invention. By way of illustration, a typical diameter of the core and the cladding layer, taken together, is about 125 microns for single mode fibers. Each polymeric coating material has a thickness of about 30 microns so that the overall diameter of the coated optical fiber is approximately 250 microns.

The optical fiber ribbon of the present invention further includes a ribbon matrix material which maintains the plurality of coated optical fibers in substantially coplanar alignment. The ribbon material can encapsulate the plurality of optical fibers, or, alternatively, two optical fibers can be bonded to each other with the matrix material. The matrix material can be made of a single layer or of a composite construction. Suitable matrix materials include polyvinyl chloride as well as other materials known to be useful as primary and secondary polymeric coating materials. Preferably, the matrix mixture is the same type of material as that used in the optional secondary coating.

The optical fibers and ribbons of the present invention comprise an adhesion promoter. The adhesion promoter preferably is a silane or a silane-containing compound. Silanes act as both adhesion promoters and coupling agents. Silanes are effective in these roles because they provide a stable bond between two dissimilar surfaces, such as the organic polymer of the coating composition and the inorganic substrate, such as the glass cladding layer of the optical fiber. Enhanced bonding between the inorganic and organic components generally results in greater strength and service life of the coating. Various silane and even non-silane compounds are added, generally in small amounts relative to the amounts of other constituents, as adhesion promoters or coupling agents within a polymeric coating solution.

Silane coupling agents are adhesion promoters and typically can be present in an amount of about 1 weight percent. Illustrative silane coupling agents include gamma methacryloxypropyl trimethoxy silane, commercially available from United Chemical Technology (Tullytown, Pa.), under the trade designation MEMO and gamma mercaptopropyl trimethoxy silane, which is commercially available from Witco Corporation (Greenwhich, Conn.) under the designation A-189. Exemplary silane compounds, described below, are disclosed in U.S. Pat. Nos. 5,128,391, 5,109,442, 5,461, 691, 5,514,727, 5,459,175, 5,146,531, 5,352,712, 5,536,529, 4,849,462, 5,336,563, 5,219,896, 4,921,880, 5,188,864, 5,587,403, 5,527,835, 5,538,791, 5,384,342, 5,539,014, 5,239,026, 5,128,387, 4,568,566, 4,875,759, 5,018,829, Re. 33,677, 5,595,820, 4,889,901, 4,099,837, and 5,262,362, each of which is incorporated herein by reference in its entirety.

One skilled in the art is familiar with organofunctional silanes which can be used as adhesion promoting agents. Organofunctional silanes which can be used in the present invention include, but are not limited to, methyltrichlorosilane, methyldichlorosilane, dimethyldichlorosilane, methyltriethoxysilane, methyltrimethoxy-silane, gamma-aminopropyltriethoxysilane, gamma-aminopropyl trimethoxysilane, N-beta-(aminoethyl)-gamma-aminopropyltrimethoxysilane, gamma-ureido propyltriethoxy-silane, N-(2-aminoethyl)-3-aminopropyltrimethoxysilane, 3-chloropropyl trimethoxysilane, beta-(3,4-epoxycyclohexyl)ethyltrimethoxysilane, gamma-glycidoxy propyltri-methoxysilane, epoxy-propyltrimethoxysilane, gamma-mercaptopropyltriethoxy silane, gamma-mercaptopropyltrimethoxysilane, by themselves or in mixture as adhesion promoting agents.

Similarly, U.S. Pat. No. 5,461,691 also discloses specific organofunctional silanes, such as gamma-aminopropyltrimethoxysilane, N-beta-(aminoethyl)-gamma-aminopropyl trimethoxysilane, N-methylamino-propyltrimethoxysilane, and 3-azidopropyltriethoxysilane, as a constituent in a beam-curable polymeric coating composition for glass surfaces and optical fibers. In addition, U.S. Pat. No. 5,461,691 also discloses the use of general azidosilane compound which may also include an additional aminoalkoxysilane compound. The azidosilane compound has the formula $N_3—R^3—Si—R^1{}_n(OR^2)_{3-n}$, wherein $R^1$ represents a $C_1$–$C_3$ -alkyl, phenyl, benzyl, or toluyl group, $R^2$ represents a $C_1$–$C_4$-alkyl or $C_2$–$C_4$-alkoxyalkyl, phenyl or benzyl group, $R^3$ represents a $C_1$ to $C_8$ -alkylene group, which can be interrupted by an oxygen atom, sulfur atom or a—(N—$R^4$)-group, wherein $R^4$ denotes a hydrogen, or a methyl, ethyl or phenyl group, and n represents 0, 1, or 2. The aminoalkoxysilane compound has the formula $H_2N—R^5—Si—R^6{}_m(OR^7)_{3-m}$, wherein $R^5$ represents a group selected from the group consisting of $C_1$–$C_6$-alkylene or a $C_5$–$C_6$, -cycloalkylene or arylene group, which can additionally be substituted by one or two $C_1$–$C_3$ -alkyl groups, and $R^6$ and $R^7$, independently, represent a $C_1$–$C_6$-alkyl or a $C_5$–$C_6$-cycloalkyl group, which can likewise additionally be substituted by one or two $C_1$–$C_3$-alkyl groups and m represents 0, 1, or 2. The total weight percentage of silane in the overall coating composition is 0.5% to 6% depending upon the other constituents within the coating composition and the silane selected.

U.S. Pat. No. 5,109,442 discloses alkyltrialkoxysilanes, namely octyltrimethoxysilane and octadecyltrimethoxysilane, as adhesion promoting agents for a water repellent fiber optic sensor. U.S. Pat. No. 5,109,442 discloses particular silanes or mixtures thereof added to a water-based polymer solution at a weight % of 0.1 to 20 by volume and then applied by some means to the surface of the fiber optic chemical sensor.

U.S. Pat. No. 5,414,727 discloses beta-(3,4-epoxycyclohexyl) ethyltrimethoxysilane and epoxypropyl trimethoxysilane as an adhesion promoting or coupling agent for a vinyl-ether containing polymer coating. U.S. Pat. No. 5,414,727 also discloses use of unsaturated organofunctional silanes, such as allyltriethoxysilane and acryloxypropyltrimethoxylsilane, as coupling agents in their coating composition. These particular silanes, or mixtures thereof, are 0–5 pph of the overall composition.

U.S. Pat. Nos. 4,921,880 and 5,188,864 disclose coating compositions comprising an alkoxysilicon compound of the formula $(RO)_3—Si—(CH_2)_n—Si(OR)_3$, wherein R is a methyl or ethyl group, and n is an integer from 1 to 10. Alternatively, the alkoxysilicon compound could have the formula $(RO)_3—Si—O(R'_2SiO)_n—Si(OR)_3$, wherein R is a methyl or ethyl group, R' is an RO—, alkyl, or aryl group, and n is an integer from 1 to 20. The adhesion promoter must also include an additional compound to catalyze the reaction between the two double bonded SiOR groups in the presence of atmospheric moisture or between the double bonded SiOR group and a hydroxyl group on the optical fiber surface or other substrate. The adhesion promoter in U.S. Pat. Nos. 4,921,880 and 5,188,864 are incorporated into an ultraviolet radiation curable siloxane composition that is to used principally as an optical fiber coating. The weight percentage of the adhesion promoter in relation to the other constituents in the coating composition of U.S. Pat. No. 4,921,880 is 0.15 to 3.5%. U.S. Pat. No. 5,188,864, where the preferred silane is bis-(trimethoxysilyl)ethane, combines the organosilane with the catalyst into an ultraviolet curable polymer composition which is applied directly to the surface of the fiber and cured. The weight percentage of the organosilane in the coating composition of U.S. Pat. No. 5,188,864 varies from 15 to 98%. The catalyst makes up the remainder of the coating composition.

The optical fibers of the present invention can also comprise an adhesion-promoting intermediary layer comprising an unsaturated organofunctional silane, such as those disclosed in U.S. Pat. Nos. 5,514,727, 5,128,391, 5,587,403, 5,527,835, 5,538,791, 5,146,531, 5,352,712, 5,336,563, 5,219,896, and 5,459,175 including allyltriethoxysilane, vinyltrichlorosilane, methylvinyldichlorosilane, vinyltriethoxysilane, vinyltrimethoxysilane, vinyl-tris-(2-methoxyethoxysilane), vinyltriacetoxysilane, gamma-methacryloxypropyltrimethoxysilane, gamma-methacryloxypropyltrimethoxysilane, gamma-methacryloxypropyl-tris-(2-methoxyethoxy)silane, acryloxypropyltrimethoxyl-silane, N-[2-(vinylbenzylamino)-ethyl]-3-aminopropyltrimethoxysilane, or mixtures thereof.

The optical fibers of the present invention can also comprise an adhesion-promoting intermediary layer comprising a vinyl ether urethane silane or vinyl ether urethane titanate, such as those disclosed in U.S. Pat. Nos. 5,384,342 and 5,539,014, having the general formula $R_1—R_2—R_3—R_4—A—(R_5)_n(R6)_{3-n}$ wherein A is either Si or Ti, $R_1$ is alkenoxy or ethylenically unsaturated dicarboxylic acid, $R_2$ is a 2–18 carbon which is a linear, branched, or cyclic alkyl, alkenyl, alkynyl, acyl, aryl, or poly(alkoxy) group, $R_3$ is a urethane, urea, or thiourethane linking group, $R_4$ is a 2–18 carbon which is linear, branched, or cyclic alkyl, alkenyl, alkynyl, acyl, or aryl non-hydrolyzable silyl linking group, $R_5$ is a 1–18 carbon which is linear, branched, or cyclic alkyl, alkenyl, alkynyl, acyl, or aryl group, and $R_6$ is a 2–18 alkoxy or alkenoxy carbon or a halogen group, and n represents 0, 1, or 2.

The optical fibers of the present invention can also comprise an adhesion-promoting intermediary layer comprising an acidic adhesion promoter, such as those disclosed in U.S. Pat. No. 5,128,387 including acrylated sulfonic acid, methacrylated sulfonic acid, acrylated sulfonic acid anhydride, methacrylated sulfonic acid anhydride, acrylated carboxylic acid, methacrylated carboxylic acid, acrylated carboxylic acid anhydride, acrylated phosphoric acid, methacrylated phosphoric acid, or mixtures thereof.

The optical fibers of the present invention can also comprise an adhesion-promoting intermediary layer comprising an organochlorosilane, such as those disclosed in U.S. Pat. Nos. 5,128,391, 5,018,829 and 4,875,759, having the formula $(R^1)_n—Si—Cl_{4-n}$ wherein n is the integer 1, 2, or 3 and the $R^1$ substituent can be a 1–18 carbon linear, branched, cyclic alkyl or alkylene group, or a enediyne, phenyl, vinyl, naphthyl, or benzyl group, or hydrogen and $R^1$ can be in combination with the same or different $R^1$ groups if n is 2 or 3.

The optical fibers of the present invention can also comprise an adhesion-promoting intermediary layer comprising an organofunctional silane, such as those disclosed in U.S. Pat. Nos. 5,128,391, 5,461,691, 5,459,175, 5,146,531, 5,352,712, 5,536,529, 4,849,462, 5,336,563, 5,219,896, and 5,459,175, selected from the group consisting of gamma-aminopropyltriethoxysilane, gamma-aminopropyl-trimethoxysilane, N-beta-(aminoethyl)-gamma-aminopropyltrimethoxysilane, N-methylaminopropyltri-methoxysilane, 3-azidopropyltriethoxysilane, gamma-ureidopropyltriethoxysilane, N-(2-aminoethyl)-3-aminopropyltrimethoxysilane, 3-chloropropyltrimethoxy-silane, beta-(3,4-epoxycyclohexyl)ethyltrimethoxysilane, gamma-glycidoxypropyltrimethoxysilane, epoxy-propyltrimethoxysilane, gamma-mercaptopropyl-triethoxysilane, gamma-mercapto-propyltrimethoxysilane, or mixtures thereof.

The optical fibers of the present invention can also comprise an adhesion-promoting intermediary layer comprising an adhesion promoter, such as those disclosed in U.S. Pat. Nos. 5,146,531, 5,352,712, 5,527,835, 4,568,566 selected from the group consisting of mercaptoalkyl-trialkoxysilane, methacryloxyalkyltrialkoxysilane, aminoalkyltrialkoxysilane, vinyltrialkoxysilane, or mixtures thereof.

The optical fibers of the present invention can also comprise an adhesion-promoting intermediary layer comprising a polyalkoxysiloxane, such as those disclosed in U.S. Pat. No. 5,595,820.

The optical fibers of the present invention can also comprise an adhesion-promoting intermediary layer comprising an acrylated epoxy oligomer containing glycidoxy groups having the following recited in U.S. Pat. No. 4,099,837.

The optical fibers of the present invention can also comprise an adhesion-promoting intermediary layer comprising a fluorinated acrylamide silane, such as those disclosed in U.S. Pat. No. 5,239,026.

The optical fibers of the present invention can also comprise an adhesion-promoting intermediary layer comprising a sol-gel coating such as those disclosed in U.S. Pat. No. 5,262,362, including tetraethoxysilane, $Al(OC_4H_9)_3$, LiOH, $Ti(OC_3H_7)_4$, $Zr_2(C_5H_7O_2)_4$, $HNO_3$, glycerol.

In preferred embodiments of the present invention, the organofunctional silanes, 3-acryloxypropyltri-methoxysilane, 3-methacryloxypropyltrimethoxysilane, vinyltrimethoxysilane, allyltrimethoxysilane, 1,4-bis(trimethoxysilylethyl)benzene, 3-mercaptopropyl-trimethoxysilane, and N-beta-(aminoethyl)-gamma-aminotrimethoxy-silane, or mixtures thereof, were added as an intermediary layer to the surface of the cladding of an optical fiber. Excellent results for adhesion promotion of the cladding layer to the primary or inner primary coating layer were achieved with the 1,4 bis(trimethoxysilylethyl) benzene.

The optical fiber ribbons of the present invention allow removal of a portion of the primary polymeric coating material from the cladding layer so that the residual primary polymeric coating material left on the cladding layer by the removal process is sufficiently uniform to permit precise alignment of the ribbons. Consequently, the optical fiber ribbons of the present invention allow production of high quality splices using mass fusion splicing techniques. At the same time, the adhesion of the primary coating material to the cladding layer is sufficient to prevent delamination in moist environments and, therefor, to prevent exposure of the cladding layer and core to the destructive effects of moisture and other environmental hazards.

Production of the optical fiber ribbon of the present invention can be effected by methods described below. In brief, the process involves fabricating the core and cladding layer, coating the cladding layer with the adhesion-promoting layer, then applying the primary polymeric coating material to the adhesion-promoting layer, optionally coating the primary polymeric coating material with a secondary polymeric coating material, optionally disposing an ink coating around the secondary coating material, arranging a plurality of the coated optical fibers in a coplanar configuration, and applying a ribbon matrix material to the fibers so that the planar arrangement is thereafter maintained.

The core and cladding layer may be produced in a single operation by methods which are well known in the art. Suitable methods include the double crucible method, described, for example, in Midwinter, "Optical Fibers for Transmission," New York, John Wiley, pp. 166–178 (1979), which is incorporated herein by reference in its entirety; rod-in-tube procedures; and doped deposited silica ("DDS") processes (also commonly referred to as chemical vapor deposition ("CVD") processes or vapor phase oxidation ("VPO") processes). A variety of DDS processes are known and are suitable for producing the core and cladding layer used in the optical fiber ribbon of the present invention. They include external CVD, described in, for example, Blakenship et al., "The Outside Vapor Deposition Method of Fabricating Optical Waveguide Fibers," IEEE J. Quantum Electron., 18:1418–1423 (1982) ("OVD"), which is incorporated herein by reference in its entirety; vapor axial deposition ("VAD") processes, described in, for example, Inada, "Recent Progress in Fiber Fabrication Techniques by Vapor-phase Axial Deposition," IEEE J. Quantum Electron., 18:1424–1431, which is incorporated herein by reference in its entirety; and internal CVD (also commonly referred to as modified CVD ("MCVD") or inside vapor deposition ("IVD")), described in, for example, Nagel et al., "An Overview of the Modified Chemical Vapor Deposition (MCVD) Process and Performance," IEEE J. Quantum Electron., 18:459–476 (1982), which is incorporated herein by reference in its entirety.

Glassy optical fibers can be drawn from a specially prepared, cylindrical consolidated preform which has been locally and symmetrically heated to a temperature of about 2000° C. As the preform is heated, such as by feeding the preform into and through a furnace, a glass fiber is drawn from the molten material. The adhesion-promoting layer, primary and optional secondary coating materials are applied to the glass fiber after it has been drawn from the preform, preferably immediately thereafter. In general, the primary polymeric coating material, in an uncured or solution form, is applied to the glass fiber, typically by passing the fiber through a pool of the uncured or dissolved primary polymeric coating material. The coating is then cured or the solvent if then removed to produced a cured, coated optical fiber. The method of curing can be thermal or photonic, such as by exposing the coated uncured polymeric coating material to ultraviolet light, depending on the nature of the polymeric coating material and initiator being employed. It is frequently advantageous to apply both the primary and secondary polymeric coating materials, in sequence, during the drawing process. One method of applying dual layers of coating materials to a moving glass fiber is disclosed in U.S. Pat. No. 4,474,830, which is incorporated herein by reference in its entirety. Another method for applying dual layers of coating materials onto a glass fiber is disclosed in U.S. Pat. No. 4,851,165, which is incorporated herein by reference in its entirety. Similarly, the ink coating can be applied.

The coated optical fibers are then disposed in a coplanar arrangement and held in this arrangement while an uncured ribbon matrix material is applied and cured. It may be advantageous, in some instances, to initially prepare a plurality of reels of coated optical fibers and then to produce the optical fiber ribbon in a separate process, particularly if the optimum speeds of fiber drawing and coating and ribbon manufacture are significantly different.

A typical UV-curable ribbon matrix material is a mixture comprising a resin, a diluent, and a photoinitiator. The resin can include a diethylenic-terminated resin synthesized from a reaction of a hydroxy-terminated alkyl acrylate with a reaction product of a polyester of polyether polyol of molecular weight of 1000 to 6000 daltons with an aliphatic or aromatic diisocyanate. Alternatively, the resin can include a diethylenic-terminated resin synthesized from the reaction of glycidol acrylate with a carboxylic-terminated polymer or polyether of molecular weight 1000 to 6000 daltons. The diluent can comprise monofunctional or multifunctional acrylic acid esters having a molecular weight of 100 to 1000 daltons, N-vinylpyrrolidinone, or vinyl caprolactam. Photoinitiators, suitable for use in the ribbon matrix material include, but are not limited to, ketonic compounds, such as diethoxyacetophenone, acetophenone, benzophenone, benzoin, anthraquinone, and benzyl dimethyl ketal. In a typical composition, the ribbon matrix material can include a resin (50–90 weight %), diluents (5–40 weight %), and a photoinitiator (1–10 weight %). Other suitable additives, such as methacrylates, UV-curing epoxies, or unsaturated polyesters, can also be used.

A variety of methods can be used for encapsulating the optical fibers in a ribbon matrix material. Briefly, the plurality of coated optical fibers are conducted side-by-side through a liquid ribbon matrix material, which is advantageously delivered under pressure or under vacuum in a coating chamber or substantially rectangular cross section. More detailed information regarding the production of encapsulated optical fiber ribbons is available in U.S. Pat. Nos. 4,752,112 and 5,486,378, each of which are incorporated herein by reference in its entirety.

In cases where the ribbon matrix material is the same as the outermost polymeric coating material, the ribbon matrix can be formed by applying a suitable solvent to the outermost polymeric coating material, while adjacent optical fibers are in tangential contact. The solvent dissolves a portion of the outermost polymeric coating material, and, upon evaporation of the solvent, adjacent optical fibers become fused to each other, thus forming the optical fiber ribbon. In this process, solvent drying may be effected by exposure to ambient air, or it may be aided, such as by directing solvent-absorbing gas onto the advancing fiber ribbon. Prior to storage on a reel, the ribbon is advantageously dusted with powder such as calcium stearate, to decrease any residual tackiness that may have resulted from exposure to the solvent. In forming the ribbon matrix material from the outermost polymeric coating material, the solvent must be carefully chosen and applied in controlled quantities and concentrations. If the solvent is too active, it will tend to strip away the outermost polymeric coating material altogether. On the other hand, a weak solvent will not sufficiently dissolve the coating. More details relating to solvent welding as a means of producing a optical fiber ribbon are disclosed in British Patent No. 1,570,624 and U.S. Pat. No. 4,147,407, each of which is incorporated herein by reference in its entirety.

The optical fibers and ribbons of the present invention can be stripped. The primary polymeric coating material adheres to the cladding layer to form a cladding layer-primary polymeric coating material interface. A longitudinal stripping force is applied at the cladding layer-primary polymeric coating material interface effective to remove substantially the ribbon matrix material and the primary polymeric coating material (as well as the optional secondary polymeric coating material and the optional ink coating if they are present) from the cladding layer. The ribbon matrix material is constituted to leave a continuous, smooth residual layer of the primary polymeric coating material with a thickness of less than about 5 $\mu$m as a result of applying the longitudinal stripping force.

The longitudinal stripping force is provided to the cladding layer-primary polymeric coating material interface by a stripping tool. The stripping tool has a pair of opposing cutting blades and a blade gap equal to or slightly greater than the diameter of the combined core and cladding layer (i.e. equal to or slightly greater than the sum of the core's diameter and twice the cladding layer's thickness). The ribbon is inserted into the stripping tool near one end of the ribbon with the portion of the ribbon which is to have its coatings removed extending beyond the forward edge of the cutting blades, and the blades are brought together until the distance separating them is equal to the blade gap. This action cuts through opposite sides of the ribbon matrix material, the optional ink coating, the optional secondary polymeric coating material, and most of the primary polymeric coating material so that a well defined break in the coating and ribbon matrix materials can be made. While maintained in the closed position, the blades are moved toward the end of the ribbon being stripped, thereby exerting a longitudinal (i.e. parallel to the optical fiber axis) stripping force at the cladding layer-primary polymeric coating material interface. In many cases, the amount of longitudinal stripping force required to remove the coating and ribbon matrix material can be reduced by applying heat, typically in the range of from about 80 to about 110° C. for from less than one second to several minutes, to the surface of that portion of the ribbon matrix material being removed prior to applying the longitudinal force.

Tools particularly well suited to effecting the stripping operation are commercially available. Preferred stripping tools include Fujikura HJS-01 and Sumitomo JR4A thermal strippers set to 60–140° C. and a 150 $\mu$m blade gap.

The present invention is further illustrated by the following examples.

EXAMPLE

Example 1

Formation of Adhesion-Promoting Intermediary Layer

A bare optical fiber, consisting of a central core and cladding, is prepared using any of the manufacturing techniques disclosed. After the drawing step, the bare optical fiber is fed through a CVD chamber with a controlled flow of silane and a bubble-free gas, such as carbon dioxide, and a controlled temperature of about 60–100° C. The adhesion promoter, a silane (gamma mercaptopropyl trimethoxy silane), is vaporized and is deposited onto the surface of the bare optical fiber forming an adhesion-promoting intermediary layer less than about 1 $\mu$m thick. The intermediary layer remains at this interface to form adhesive bonds between the cladding and the primary coating. After the intermediary layer is applied, the primary coating is applied by passing the fiber through a bath of liquid acrylate solution. The liquid acrylate solution is cured via exposure to ultraviolet radiation.

A control fiber was made without adding the adhesion-promoting intermediary layer. The coating on the control fiber is available from DSM Desotech Inc. (Elgin, Ill.) as a dual UV curable acrylate coating system. Three other fibers were prepared incorporating the adhesion-promoting intermediary layer before the application of the primary coating. The intermediary layer of the three fibers was applied to the bare optical fiber by varying such parameters as the concentration of silane that was introduced into the chamber, the flow rate of the carbon dioxide, the location of the carbon dioxide port, and the temperature range of the chamber. The draw speed of the three fibers and the control fiber remained the same. After the intermediary layer was applied, all three fibers had the primary coating applied in the same fashion. The three fibers and the control fiber were then evaluated. The following table illustrates the results:

TABLE 1

Introduction of Silane to Glass/Coating Interface by Carbon Dioxide

| Fiber: | Control | Fiber 1 | Fiber 2 | Fiber 3 |
| --- | --- | --- | --- | --- |
| Draw Speed (m/s) | 10 | 10 | 10 | 10 |
| Silane Concentration | No | Maximum | Low | Medium |
| CO$_2$ Flow Rate (CF/H) Silane atomizer | | 3 | 2 | 6 |
| CO$_2$ Flow Rate (CF/H) Vaporizing and Mixing Chamber | | 6 | 8 | 8 |
| CO$_2$ port | | Coater block | Chamber | Chamber |
| Coating defects | OK | Diameter upset | OK | Diameter upset |
| MD, 2 days at 65° C. | Delamination | Numerous MD | Numerous MD | No MD, misty |
| MD, 14 days at 65° C. | Delamination | Numerous MD | Numerous MD | No MD, misty |

The MD (microdelamination) test is a test to determination the adhesion of the coating to the cladding. A fiber which exhibits lower MD has better adhesion. The addition of a silane intermediary layer improves the adhesion of the primary or inner coating to the cladding. Fiber 3, which had a medium concentration of silane in the CVD chamber, showed no MIS and had the best adhesion of the four fibers evaluated.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A method of applying an adhesion-promoting intermediary layer to an optical fiber comprising the steps of:
    atomizing an adhesion promoter;
    vaporizing the atomized adhesion promoter in a carrier gas, thereby forming a mixture of the adhesion promoter and the carrier gas; and
    contacting a surface of said optical fiber with the mixture of the adhesion promoter and the carrier gas to form an adhesion-promoting intermediary layer on the surface of the optical fiber.

2. The method of claim 1 wherein said carrier gas is a bubble-free gas.

3. The method of claim 2 wherein said bubble-free gas comprises a gas selected from the group consisting of carbon dioxide, helium, oxygen, or a mixture thereof.

4. The method of claim 1 wherein said adhesion promoter comprises a silane.

5. The method of claim 4 wherein said silane comprises a silane selected from the group consisting of azidosilane, aminoalkoxysilane, polymeric silane, polymeric organosilane, organofunctional silane, vinyl ether urethane silane, organochlorosilane, polyalkoxysiloxane, and fluorinated acrylamide silane.

6. The method according to claim 4 wherein said silane is selected from the group consisting of azidosilane, aminoalkoxysilane, vinyl ether urethane silane, organochlorosilane, polyalkoxysiloxane, halo-silane, acyloxy-silane, amino-silane, and alkoxy-silane.

7. The method of claim 1 wherein said adhesion promoter comprises 1,4-bis(trimethoxysilylethyl)benzene.

8. The method according to claim 1 wherein said adhesion promoter comprises an acrylate silane.

9. The method according to claim 8 wherein said acrylate silane comprises acryloxypropyltrimethoxysilane.

10. The method according to claim 1 wherein said adhesion promoter comprises a silicon containing compound and at least one hydrolyzable group bonded to the silicon of said silicon containing compound.

11. The method according to claim 1 wherein said carrier gas comprises a bubble free gas.

12. The method according to claim 11 wherein said bubble free gas comprises one selected from oxygen, helium, carbon dioxide, and mixtures thereof.

13. The method according to claim 1 wherein said adhesion promoter comprises an alkoxy silane.

14. A method of coating an optical fiber comprising the steps of:
    atomizing an adhesion promoter;
    vaporizing the atomized adhesion promoter in a carrier gas, thereby forming a mixture of the adhesion promoter and the carrier gas; and
    contacting a glass surface of said optical fiber with the mixture of the adhesion promoter and the carrier gas to form an adhesion-promoting intermediary layer on the surface of the optical fiber;
    contacting said adhesion promoting layer with an acrylate; and
    curing said acrylate with ultraviolet radiation to form a primary polymeric coating material layer surrounding said adhesion-promoting intermediary layer.

15. The method of claim 14 wherein said carrier gas comprises a bubble-free gas.

16. The method of claim 15 wherein said bubble-free gas comprises a gas selected from the group consisting of carbon dioxide, helium, oxygen, or a mixture thereof.

17. The method of claim 14 wherein said adhesion promoter comprises a silane.

18. The method of claim 17 wherein said silane comprises a silane selected from the group consisting of azidosilane, aminoalkoxysilane, polymeric silane, polymeric organosilane, organofunctional silane, vinyl ether urethane silane, organochlorosilane, polyalkoxysiloxane, and fluorinated acrylamide silane.

19. The method of claim 14 wherein said adhesion promoter comprises 1,4-bis(trimethoxysilylethyl)benzene.

20. The method of claim 14 further comprising the step of contacting said primary polymeric coating layer with a second acrylate and curing said second acrylate with ultraviolet radiation to form a secondary polymeric coating material layer surrounding said primary polymeric coating material layer.

21. The method of claim 14 wherein said contacting occurs at a temperature below the boiling temperature of the adhesion promoter.

22. The method of claim 21 wherein said temperature comprises no more than 100° C.

23. The method of claim 21 wherein said temperature comprises at least about 60° C.

24. An optical fiber comprising:
   a core;
   a cladding layer surrounding said core;
   an adhesion-promoting intermediary layer comprising 1,4-bis(trimethoxy silylethyl)benzene surrounding said cladding layer; and
   a primary polymeric coating material comprising an acrylate compound surrounding said adhesion-promoting intermediary layer.

25. The optical fiber of claim 24 further comprising a secondary polymeric coating material surrounding said primary polymeric coating material, wherein said secondary polymeric coating material comprises an acrylate compound.

26. The optical fiber of claim 24 wherein said adhesion-promoting intermediary layer is less than about 1 μm thick.

27. A method of coating an optical fiber comprising the steps of:
   contacting a glass surface of the optical fiber with a mixture of an organofunctional silane adhesion promoter and a carrier gas to form an adhesion-promoting intermediary layer at a temperature between about 60° C. and about 100° C.;
   contacting said adhesion-promoting intermediary layer with an acrylate; and
   curing said acrylate with ultraviolet radiation to form a primary polymeric coating material layer surrounding said adhesion-promoting intermediary layer.

28. The method of claim 27 wherein the adhesion promoter is an alkoxysilane or a chlorosilane.

* * * * *